C. A. MARSHALL.
SIGN.
APPLICATION FILED APR. 29, 1915.
1,224,480.
Patented May 1, 1917.
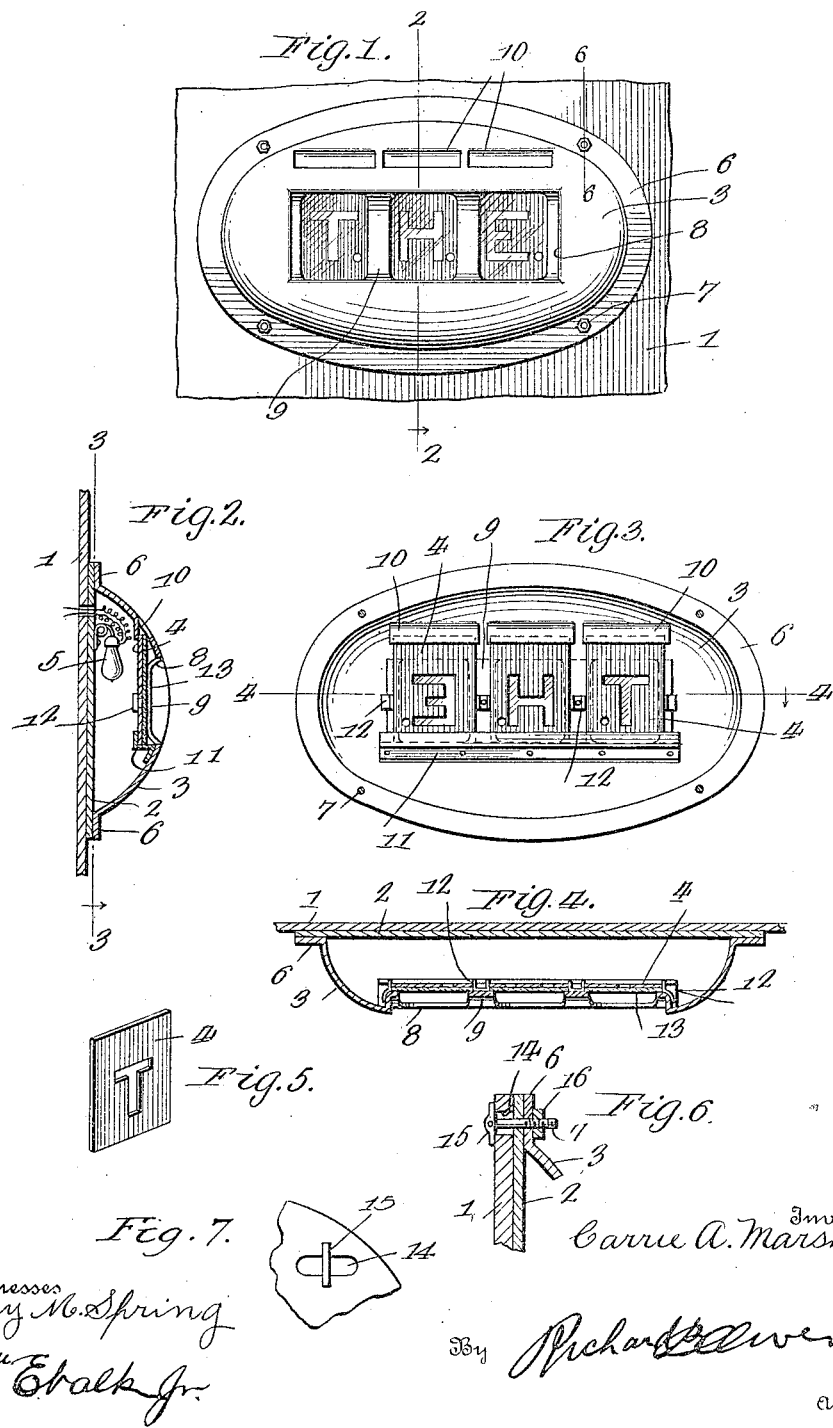

UNITED STATES PATENT OFFICE.

CARRIE A. MARSHALL, OF WHITEWATER, WISCONSIN.

SIGN.

1,224,480. Specification of Letters Patent. Patented May 1, 1917.

Application filed April 29, 1915. Serial No. 24,767.

*To all whom it may concern:*

Be it known that I, CARRIE A. MARSHALL, citizen of the United States, residing at Whitewater, in the county of Walworth and State of Wisconsin, have invented certain new and useful Improvements in Signs, of which the following is a specification.

My invention relates to interchangeable signs and is designed primarily for use in connection with automobiles and other vehicles to display in a clear and attractive manner the initials of the owner of the car or machine.

As an object of the invention I contemplate a support of novel construction whereby the interchangeable sign block or letters may be releasably yet positively held against casual displacement and in such relation to a source of light as to be properly and clearly illuminated thereby.

A further object of the invention is to provide a means, utilizable as suggested, to enable the owner of a car or machine to quickly and readily recognize his or her car, at night, and when parked or curbed with others.

As a still further object of the invention I aim to provide a simple and inexpensive substitute for the painted monogram or initials now appearing upon automobiles and other vehicles, the substitute, as stated, being visible at night and adding materially to the attractivity of the car or machine.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1 is an elevation of my improved vehicle sign;

Fig. 2 is a section on the line 2—2 of Fig. 1;

Fig. 3 is an elevation, the opposite side from that illustrated in Fig. 1 being shown;

Fig. 4 is a section on the line 4—4 of Fig. 3;

Fig. 5 is a perspective view of one of the interchangeable letter blocks; and

Fig. 6 is a fragmentary sectional view, enlarged, taken on the line 6—6 of Fig. 1.

Fig. 7, is a detail fragmentary view in rear elevation illustrating the manner in which the bolts are secured.

Before proceeding with the description of the drawings I desire to call particular attention to the fact that while I have evolved my invention with reference to its use as an automobile accessory, the same may be utilized, in a like capacity, in connection with carriages, railway cars, and in fact vehicles generally.

Referring now to the drawings by numerals, 1 designates a fragment of an automobile or machine equipped with my improved interchangeable illuminated sign. The sign in its preferred embodiment may be said to consist of a base plate 2 and cover plate 3, the former acting as a reflector and the latter as a means whereby the interchangeable letter blocks 4, light 5, and fastening means (to be hereinafter described) may be properly and completely inclosed. The plate 3 is of an oval formation and flanged as indicated at 6 throughout its periphery, the flange abutting the base plate 2 to which it is detachably secured as indicated at 7. The securing means not only penetrates the mentioned plates, but also penetrates that portion of the machine or car to which the sign is attached.

Openings, preferably three, designated 8 are formed in the cover plate 3, the openings being in horizontal alinement, the dividing strips designated 9 being forced inwardly as shown to advantage in Fig. 2 whereby to form vertical abutment surfaces for the letter blocks 4.

The mentioned plate 3, above each opening 8, is instruck as indicated at 10, the instruck portions, with a longitudinally disposed support member 11 affording a means whereby the letter blocks 4 may be held in place forwardly of the light 5 and against the dividing strips 7. The openings formed by the instruck portions 10 will permit of access to the interior of the sign structure thus allowing the letter blocks to be removed and replaced at will. The several inturned strips or tongues 10, as they will be hereinafter called, act as guides for the blocks 4 during insertion.

Retaining members 12 are affixed to the dividing strip 9 and to the plate 3 adjacent each end of the depressed portion thereof, the several members 12 holding the letter blocks against lateral movement when properly and finally placed forwardly of the light and between the support 11 and the holding means 10. A glass 13 is positioned against the forward face of each letter block, which glass may be colored, if desired, to add materially to the beauty of the sign and to preclude the admission of dust and like foreign substances to the interiorly located reflector face formed upon the base plate 2.

If desired, the attachment 7 whereby the sign is held in place may be constructed as shown to advantage in Fig. 6, in which event, an opening 14 should be formed in that portion of the car or machine supporting the sign, the opening being of a size to receive the head 15 of the fastening member when turned into alinement therewith. In Fig. 6 the head is shown to straddle or extend transversely of the opening 14 and to effectually hold a nut 16 upon the fastening means in proper place. The manner in which the parts may be disconnected is readily apparent upon reference to said Fig. 6.

From the foregoing, taken in connection with the accompanying drawings it is evident that a simple, positive and attractive means has been provided whereby the initials of the occupant of the car (or rather the owner) may be displayed or portrayed to full view of passers-by; that the owner of the car, even if intoxicated can readily ascertain at a glance which car belongs to him; and that the novel support means provided for the sign block is of such a nature as to permit of free and ready removal of the mentioned block without detaching the base plate 3 of the sign.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. An interchangeable sign comprising a base reflector plate, a forward cover plate having exposure openings formed therein, those portions of the cover plate separating the openings being depressed to form abutment surfaces, a support extending longitudinally of the sign interiorly thereof and beneath the several openings, instruck retaining members integral with the cover plate, and letter blocks insertible through the openings thus formed, said members and said support releasably and yieldingly maintaining the letter blocks in place behind the exposure openings and against the abutment surfaces substantially as described.

2. An interchangeable sign comprising a base plate, a cover plate having an opening formed therein, a support affixed to the cover plate beneath the opening, an instruck retaining member integral with the cover plate above the opening, a retaining member at each side of the opening, and a letter block insertible through the opening thus formed, said members acting as a guide for the letter block during insertion, the mentioned block being held in place by the retaining members, the support member, and the mentioned instruck tongue.

3. An interchangeable sign comprising a base reflector plate, a forward substantially elliptical cover plate affixed to the base plate, the said cover plate having a plurality of openings formed therein; a depressed strip separating the openings and forming abutment surfaces therebetween, a support extending longitudinally of the sign interiorly thereof and beneath the several openings, an instruck retaining tongue integral with the cover plate and above each of the several openings, retaining members positioned at each side of the mentioned openings, an illuminating means located interiorly of the sign and forwardly of the reflector plate, and a plurality of letter blocks insertible one through each of the openings formed adjacent the several instruck tongues, the said tongues acting as guides therefor during insertion, the several letter blocks being held in place by the mentioned retaining members, the said support, and the several retaining tongues aforesaid, substantially as described.

In testimony whereof I affix my signature in presence of two witnesses.

(Mrs.) CARRIE A. MARSHALL.

Witnesses:
R. G. BROWN,
ETTA A. ANDERSON.

Copies of this patent may be obtained for five cents each, by addressing the "Commissioner of Patents, Washington, D. C."